UNITED STATES PATENT OFFICE.

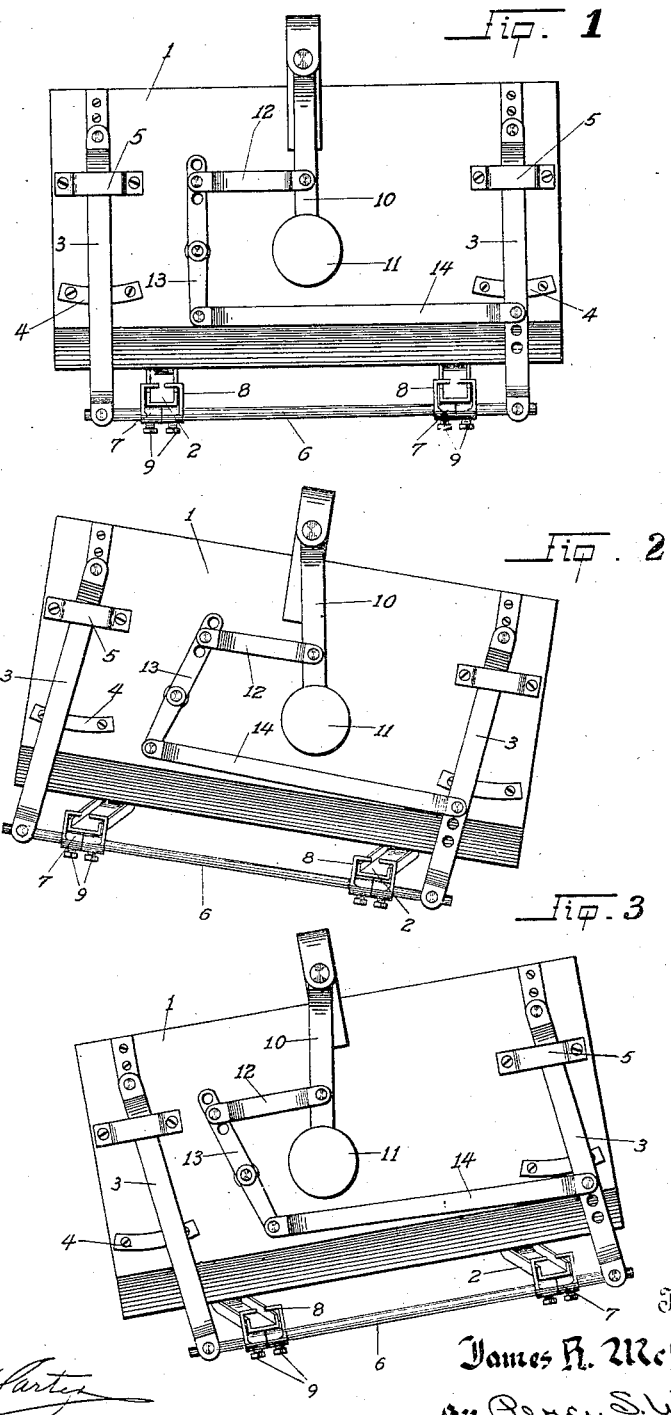

JAMES R. McHENRY, OF MONTPELLIER, CALIFORNIA.

AUTOMATIC FEED-REGULATOR FOR SEEDERS.

No. 868,213.

Specification of Letters Patent.

Patented Oct. 15, 1907.

Application filed April 30, 1907. Serial No. 371,126.

*To all whom it may concern:*

Be it known that I, JAMES R. McHENRY, a citizen of the United States, residing at Montpellier, in the county of Stanislaus and State of California, have invented certain new and useful Improvements in Automatic Feed-Regulators for Seeders; and I do declare the following to be a full, clear, and exact description of the same, such as will enable others skilled in the art to which it appertains to make and use the same, reference being had to the accompanying drawings, and to the characters of reference marked thereon, which form a part of this specification.

This invention relates to improvements in farming implements and particularly to seeders used on plows and similar implements, the object of the invention being to distribute the seed equally under all conditions.

At present when the plow is running down hill the seed (where the feed troughs are fastened stationary to the machine) falls too far forward, thus falling too far in front of the turning furrow, and a great deal of it is covered so deep it cannot come up, being therefore a loss and the farmer must sow more than he otherwise would. Also in going uphill the seed falls too far rearward and is not covered at all and is either picked up by the birds or the sun keeps it so dry it never sprouts. It is to overcome these objections that I have designed my device and the same is accomplished by means of pivoted troughs, having a pivoted lever weight linked to said troughs in such manner as to force them forward or rearward as the machine travels up or down hill, thus always distributing the seed equally; also by such other and further construction as will appear by a perusal of the following specification and claims.

In the drawings similar characters of reference indicate corresponding parts in the several views.

Figure 1 is a side elevation of a seeder box showing my device installed thereon and in such position as it appears when the machine is running in a level position. Fig. 2 is a similar view as it appears when the machine is traveling down hill. Fig. 3 is a similar view as it appears when the machine is traveling up hill.

Referring more particularly to the reference numerals on the drawings 1 represents the seeder box pivotally connected to which are two feed troughs 2. 3 are levers swingingly pivoted on each end of one side of said seeder and bearing on bars 4 and swinging within guides 5. 6 is a cross rod pivotally connecting the lower ends of the levers 3. Mounted on said rod 6 are sleeves 7 having cages or couplings 8 extending upward therefrom, the troughs 2 extending through said cages. The position of the sleeves 7 on the rod 6 is regulated by means of set screws 9. Pivotally mounted at the center of said box 1 is a lever 10 having a weight 11 at its lower end. A link 12 connects said lever 10 to a lever 13 pivoted on the side of the box 1, the lower end of said lever 13 being pivotally connected to one of the levers 3 by means of a link 14. In practice the sleeves 7 are set at such position on the rod 6 as fixes the troughs 2 in the desired normal position.

When the machine is in operation and strikes a down hill grade, the box 1 naturally tips forward, but the law of gravity causes the weight 11 on the lever 10 to remain in its normal vertical position. This action causes the link 12 to pull the top of the lever 13 forward (Fig. 2), the end of said lever pulling the link 14 rearward, which action pulls the levers 3 and rod 6 backward, thus moving the troughs 2 into such backward position, (by means of cages 8) as will cause the seed to fall in the proper place. Vice versa when the machine strikes an up grade the reverse of the above operation takes place (Fig. 3) thus moving the troughs 2 forward to such position as will cause the seed to fall in the proper position. Thus it will be seen that I have produced a device which employs the natural law of gravity for maintaining an automatic regulation of the feeder of a seeder, which device substantially fulfils all the objects of the invention as set forth herein.

While in this specification I have set forth in detail the present and preferred construction of the device, still in practice many small deviations from such detail may be resorted to without departing from the spirit of the invention.

Having thus described my invention what I claim as new and useful and desire to secure by Letters Patent is:—

1. In a device of the character described a seeder box, feed troughs arranged thereon, and means for regulating the movement of said troughs, as set forth.

2. In a device of the character described a seeder, feed troughs arranged thereon, and means for automatically regulating the position of said troughs, as specified.

3. In a device of the character described a seeder, feed troughs pivoted thereto and means for automatically regulating the position of such troughs by the position of the seeder, as set forth.

4. In a device of the character described a seeder, feed troughs pivoted thereto, a lever pivotally mounted on said seeder, a weight on the lower end of said lever, and link connections from said lever to said troughs, as set forth.

5. In a device of the kind described a seeder, feed troughs pivoted thereto, a lever pivoted to said seeder, a weight on the lower end of said lever, and means for regulating the position of said troughs according to the position of said weights, as set forth.

6. In a device of the character described a seeder, feed troughs pivoted thereto, a lever pivoted on each end of one side of said seeder, a cross rod pivotally connecting the lower ends of said levers, sleeves slidably mounted on said cross rods, means for setting said sleeves at any desired point on said cross rod, cages extending upward from said sleeves and incasing said troughs, and a lever weight mechanism pivotally connected with said levers as set forth.

7. In a device of the character described a seeder, feed troughs pivotally secured thereto, a lever pivotally mounted at each end to the side of said seeder, a lever pivotally mounted on said seeder intermediate said first named levers, a weight on the lower end of said last named lever a lever pivotally mounted at the side of said last named lever and connected thereto by a link, a link connecting said last named lever with one of said first named levers, and means connecting said troughs with said first named levers, as set forth.

In testimony whereof I affix my signature in presence of two witnesses.

JAMES R. McHENRY.

Witnesses:
   D. L. BROWDER,
   A. B. COLLINS.